United States Patent
Park et al.

(10) Patent No.: US 7,124,136 B2
(45) Date of Patent: Oct. 17, 2006

(54) METHOD AND SYSTEM FOR PROCESSING DATA IN A MULTI-DATABASE SYSTEM

(75) Inventors: Jerome Park, Los Gatos, CA (US); Andrew Zaeske, Los Altos, CA (US)

(73) Assignee: America Online, Incorporated, Dulles, VA (US)

( * ) Notice: Subject to any disclaimer, the term of this patent is extended or adjusted under 35 U.S.C. 154(b) by 179 days.

(21) Appl. No.: 10/250,616

(22) PCT Filed: Jan. 11, 2001

(86) PCT No.: PCT/US01/01099
§ 371 (c)(1), (2), (4) Date: Jul. 3, 2003

(87) PCT Pub. No.: WO02/056201
PCT Pub. Date: Jul. 18, 2002

(65) Prior Publication Data
US 2004/0059700 A1 Mar. 25, 2004

(51) Int. Cl.
*G06F 17/30* (2006.01)

(52) U.S. Cl. .................. 707/100; 707/101; 707/102; 707/103 R; 707/104.1; 707/3

(58) Field of Classification Search ............. 707/102, 707/100, 101, 103 R, 104.1, 3
See application file for complete search history.

(56) References Cited

U.S. PATENT DOCUMENTS

| | | | |
|---|---|---|---|
| 4,625,081 A * | 11/1986 | Lotito et al. ............ | 379/88.26 |
| 5,625,811 A * | 4/1997 | Bhide et al. ............ | 707/2 |
| 6,016,478 A * | 1/2000 | Zhang et al. ............ | 705/9 |
| 6,182,121 B1 * | 1/2001 | Wlaschin ............ | 709/215 |
| 6,185,585 B1 * | 2/2001 | Sequeira ............ | 715/513 |
| 6,260,068 B1 * | 7/2001 | Zalewski et al. ............ | 709/226 |
| 6,529,214 B1 * | 3/2003 | Chase et al. ............ | 715/744 |
| 6,564,261 B1 * | 5/2003 | Gudjonsson et al. ....... | 709/227 |
| 6,757,698 B1 * | 6/2004 | McBride et al. ............ | 707/204 |
| 6,763,334 B1 * | 7/2004 | Matsumoto et al. ......... | 705/14 |
| 6,791,582 B1 * | 9/2004 | Linsey et al. ............ | 715/752 |
| 2002/0049815 A1 * | 4/2002 | Dattatri ............ | 709/206 |
| 2003/0135565 A1 * | 7/2003 | Estrada ............ | 709/206 |
| 2004/0059700 A1 * | 3/2004 | Park et al. ............ | 707/1 |
| 2004/0064733 A1 * | 4/2004 | Gong ............ | 713/201 |
| 2004/0083118 A1 * | 4/2004 | Thakkar et al. ............ | 705/1 |

OTHER PUBLICATIONS

IBM Mail—DCEMAIL—A distributed E-Mail System Design, IBM Technical Disclosure Bulletin, vol. 35, No. 4A, Sep. 1992, Armonk, NY US.

Goczyla K., A Microcomputer Database Design, Microprocessing and Microprogramming, Elsevier Science Publishers, BV, vol. 253, No. 1-5, 1989, Amsterdam.

Biswas J, et al., Distributed schedulingof meeting: A case study in prototyping distributed applications, ICSI '92, Jun. 15-18, 1992, pp. 656-665, Morristown NJ.

* cited by examiner

*Primary Examiner*—Frantz Coby
(74) *Attorney, Agent, or Firm*—Michael A. Glenn; Glenn Patent Group

(57) ABSTRACT

In a method for data processing in a multiple-database system, a fixed number of logical partitions are mapped to a number of physical databases. When a user of such system initiates a data query request, only one physical database is searched for data related to the user, even if the data is scattered among multiple databases.

23 Claims, 6 Drawing Sheets

METHOD AND SYSTEM FOR PROCESSING DATA IN A MULTI-DATABASE SYSTEM

BACKGROUND OF THE INVENTION

1. Technical Field

The invention relates to data processing in a multi-database system. More particularly, the invention relates to a system and a family of methods that provide for partitioning, storing, and searching data in a multi-database system.

2. Description of the Prior Art

Managing data in a single-database system is rather simple and straightforward. However, such database systems lack database scalability when demand for a higher database capacity arises. One solution to this problem has been adopting multiple databases. But, such systems suffer from speed degradation during data query processing. Specifically, when a user of such systems initiates a data query request, each database has to be searched even if the target data is in only one database. This data query processing is slow and inefficient.

For example, in prior electronic invitation systems, where each user may create invitation data, the invitation data is generally scattered among multiple-databases. When a user wishes to view an invitation he or she has received, a query for such information requires searching each one of the multiple databases. This data query technique is slow and inefficient. In addition, like single database systems, prior multiple-database systems lack scalability.

There is a need, therefore, for efficient multiple-database management and data query processing system and method that solve the above problems.

SUMMARY OF THE INVENTION

One presently preferred embodiment of the invention provides a system and a method for partitioning data in a database system. The method includes the steps of: mapping a database system onto a number of logical partitions, assigning a user of the database system to one of the logical partitions, and allocating a portion of the data that relates to the user to the assigned logical partition.

Another presently preferred embodiment of the invention provides a system and a method for searching data related to a user in a multi-database system that is mapped onto a number of logical partitions. The method includes the steps of: determining a logical partition assigned to a user, identifying a database mapped to the determined logical partition, and searching the identified database for the data related to the user.

DETAILED DESCRIPTION OF THE INVENTION

Figure 1:
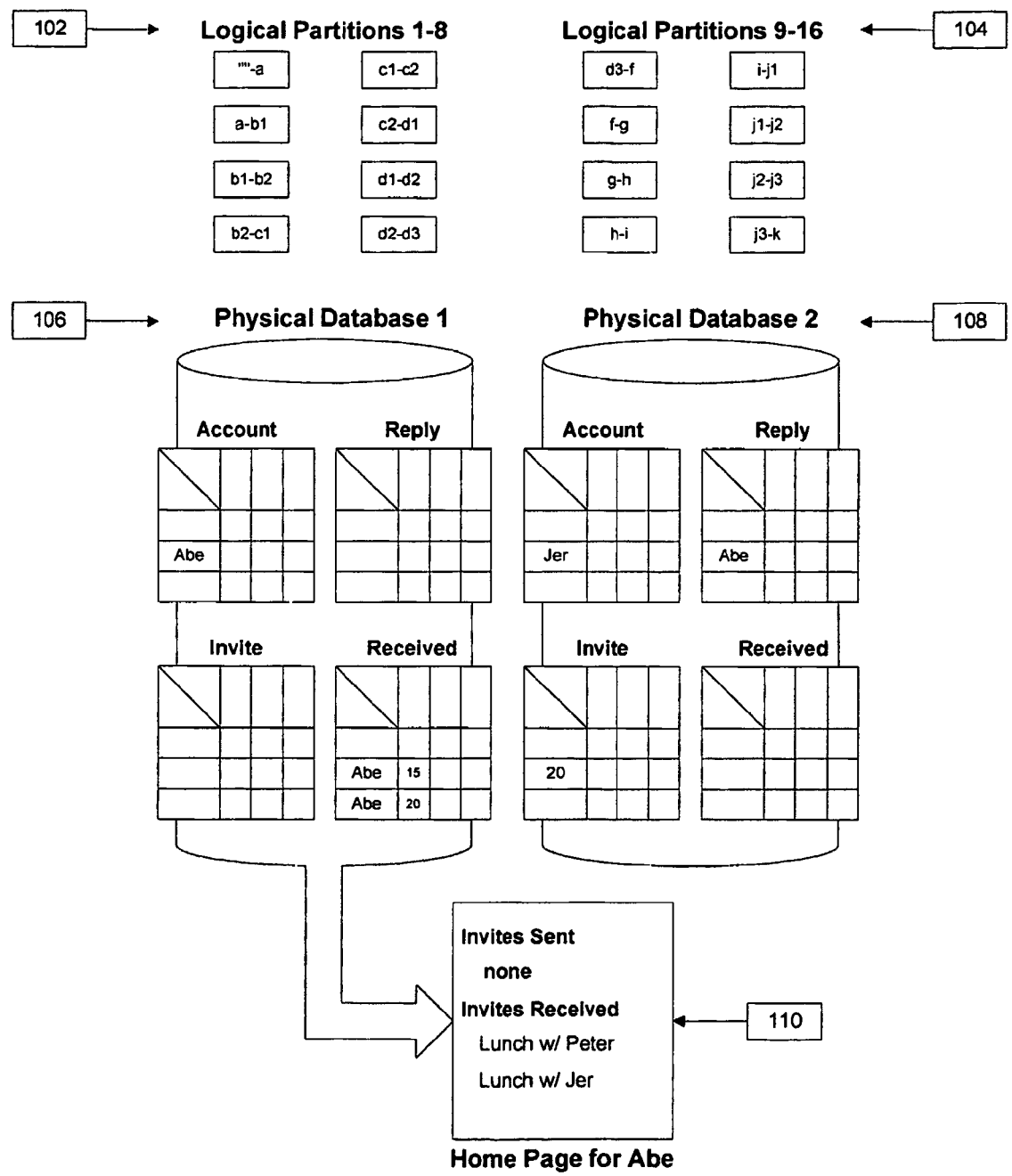
FIGS. 1(a) and 1(b) are schematic representations of a database system according to a preferred embodiment of the invention.
Figure 1:
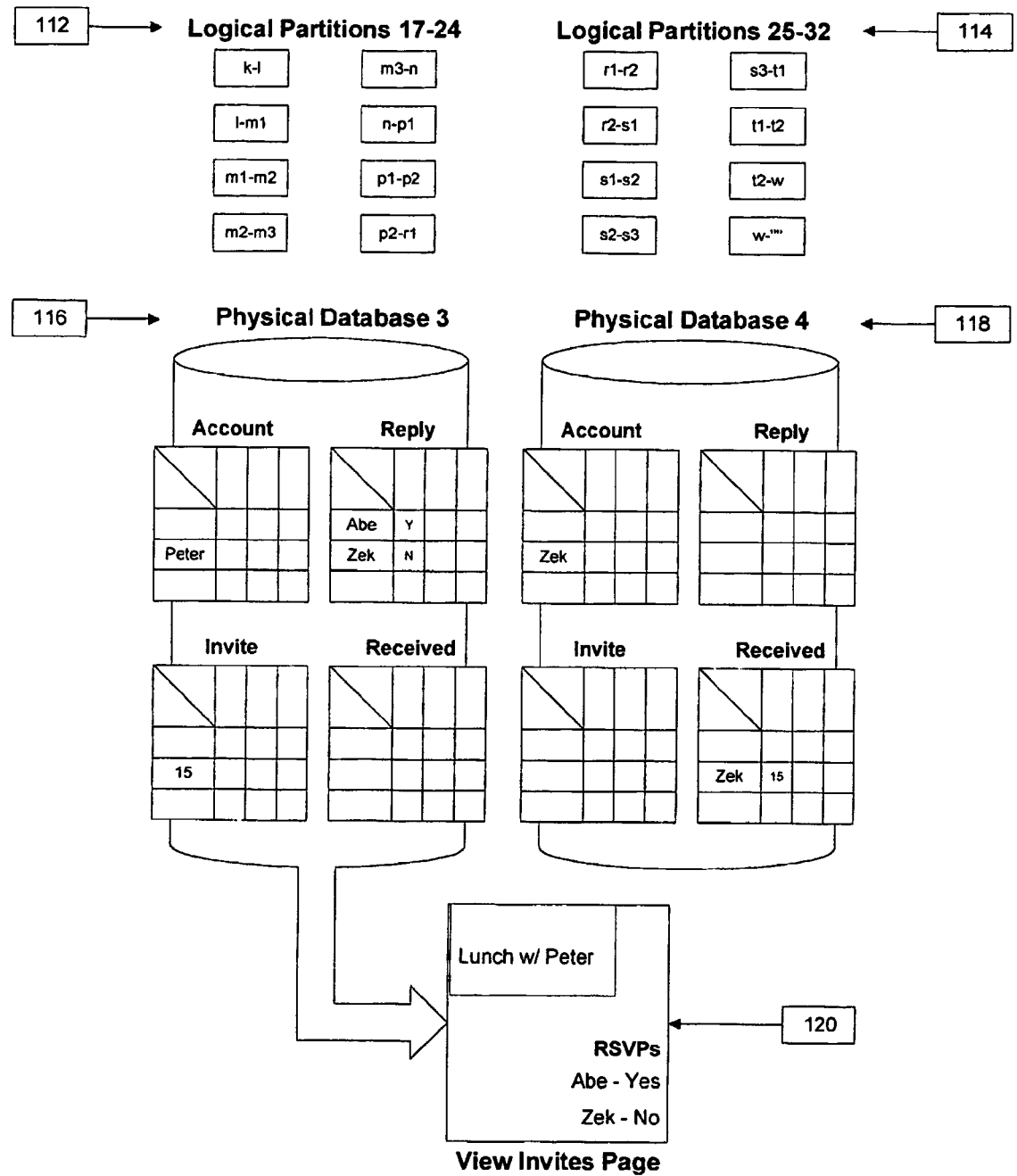

The invention contemplates new and unique system and a family of methods for efficient partitioning, storing, and searching data in a multi-database computer system, which may be implemented in a network of computer systems, such as the Internet.

FIGS. 1(a) and 1(b) provide representations of a general layout of the presently preferred embodiment of the multi-database system of the invention. To achieve a scalable multi-database system, the physical databases may be mapped onto a number of logical partitions or data buckets. Preferably, this number includes a fixed number, which may be a multiple-of-sixteen number, such as thirty-two, for example. In this way, the system and methods of the invention look at the database system in terms of logical partitions, which are kept fixed in number and organization. Accordingly, when the number of physical databases need to be changed, this change does not affect the way the system and methods of the invention function, since the number of logical partitions stays unchanged.

Depending on the number of physical databases available in the system, the number of logical partitions mapped onto a physical database is determined by dividing the number of logical partitions over the number of physical databases. For example, as shown in FIGS. 1(a) and 1(b), when the number of logical partitions is thirty-two, and there are four physical databases; 106, 108, 116, and 118; eight logical partitions are mapped onto each physical database. In this example, logical partitions 1–8, 102, are mapped onto the physical database 1, 106; logical partitions 9–16, 104, are mapped onto the physical database 2, 108; logical partitions 17–24, 112, are mapped onto the physical database 3, 116; and logical partitions 25–32, 114, are mapped onto the physical database 4, 118. Therefore, one of the advantages of mapping a fixed number of logical partitions to a variable number of physical databases is providing scalability.

The preferred mapping process discussed above advantageously enables the physical databases to be scalable to a larger size, and still be manageable under the data processing methods of the invention. Consequently, as the need for a larger physical database arises, e.g., due to demand for a higher storage capacity, the system is capable of accommodating more physical databases, without changing the number or arrangement of the logical partitions. For example, should the number of physical databases be increased from four to eight, the number of logical partitions mapped to each physical database would be four, and the system still would look at the database system in terms of the thirty-two logical partitions. Therefore, the data processing according to the invention functions independent of the number or capacity of the physical databases.

Having mapped the logical partitions to the physical databases, each user of the multiple-database system of the present invention, who successfully signs in, may be assigned to a unique logical partition. Preferably, this assignment is based on the login information received from the user. After a user successfully logs in, his or her "login name" or "screen name" may be determined from the user's login information. The login information may preferably include the user's email address. A user's screen name so obtained is used to assign the user to a logical partition, as discussed below.

According to the preferred embodiment of the invention, each logical partition is assigned to a certain group of alphabets or characters. For example, as shown in FIGS.

1(*a*) and 1(*b*), logical partitions 1–32 are arranged to accommodate all alphabets; "a" through "z." Based on such alphabetical arrangement of the logical partitions, a user's login name or screen name may be alphabetically correlated to a logical partition. In case a user's screen name starts with a non-alphabetical character, such as numeral characters, such screen names are assigned to a certain logical partition, preferably logical partition 1.

For example, as shown in FIG. 1(*a*), a user with screen name "Abe" is assigned to a logical partition that accommodates the alphabet "a," which is mapped to the physical database 1, 106. However, as shown in FIG. 1(*b*), a user with screen name "Zek" is assigned to a logical partition that accommodates the alphabet "z," which is mapped to the physical database 4, 118. Alternatively, other information about a user may be used in the assignment process of a user to a logical partition.

A logical partition assigned to a user may hold data related to the same user. Such data may include, for example, invitation data in an electronic invitation system, which may include the user's "account" information, user's "invite" information, user's "reply" information, and user's "received" information. User's account information may include information that identifies the logical partition that is assigned to the same user, and the physical database that the assigned logical partition is mapped to. User's invite information may include information about invitation or invitations that the user has created, and information about the invitees for each invitation. User's reply information may include information about the invitees for each invitation, as well as reply information received from the invitees. A user's received information includes information about the invitations the user has received, including a summary data about such invitations. More details about the above types of information will be provided later in connection with FIG. 5.

The above types of invitation data are shown for each of the four users in FIGS. 1(*a*) and 1(*b*), for example. Each user in FIGS. 1(*a*) and 1(*b*) is assigned to a logical partition that is mapped onto a physical database. For example, as shown in FIG. 1(*a*), Abe's logical partition, which is mapped onto the physical database 1, 106, includes an "account" table that identifies Abe as the user, an empty "invite" table that indicates that Abe has not invited anybody, an empty "reply" table that indicates that no invitee has replied, and a "received" table that lists two received invitations for Abe. Similarly, as shown in FIG. 1(*b*), Peter's logical partition, which is mapped onto the physical database 3, 116, includes an "account" table that identifies Peter as the user, an "invite" table that indicates that Peter has invited Abe, a "reply" table that identifies Abe and Zek as Peter's invitees, and an empty "received" table that indicates Peter has received no invitation.

A user may create invitation data to invite one or more invitees for an event. The invitation data created by an invitation creator may be maintained in the logical partition assigned to the same invitation creator. An Invitation notice is then preferably sent to each invitee. One technique to inform an invitee that he or she has received an invitation is to send a message to the invitee. For example, such message may be sent via an email to the invitee such that a selectable link is presented to the invitee that, when selected, causes the system to provide the invitation detailed information data to the invitee. Alternatively, a technique to provide invitation notice to an invitee is by sending a summary data or lookup data about an invitation to the intended invitees. After the invitees successfully log in, and they choose to view the invitation notices send to them, based on the invitees' login name or screen name a logical partition is assigned to each invitee. Then, a summary data corresponding to each invitation directed to an invitee is generated, sent to the invitee's assigned logical partition, and shown to the invitee. The summary data may be a subset of the invitation data that is maintained in the invitation creator's logical partition, and it may include some data fields that are necessary to display a list of invitations directed to an invitee. The summary data is received and maintained in the invitee's assigned logical partition.

Figure 2:
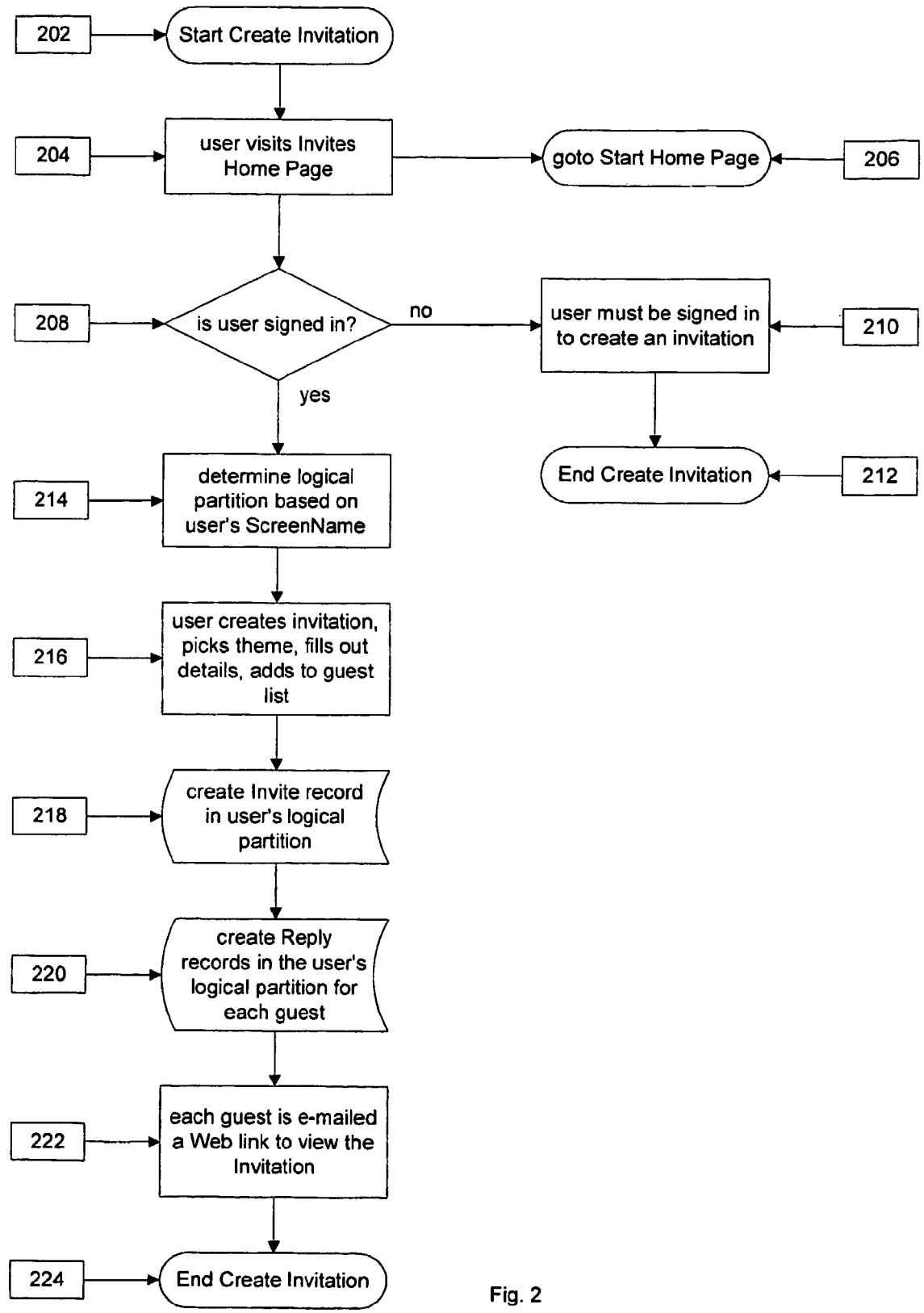
FIG. 2 is a schematic representation of creating an invitation according to a preferred embodiment of the invention.

FIG. 2 shows a presently preferred embodiment of creating an invitation data. After a user chooses to visit an "invite home page" 204, the system determines whether the user has signed in, 208. If the user has successfully signed in, the system then determines the user's screen name, from the information provided by the user during the sign in process, and uses it to assign the user to a logical partition, 216, as discussed above. Based on the user's input information, the system then creates an invite record, 218, and a reply record, 220, and stores them in the user's assigned logical partition. More details about the contents of these records will be provided later.

The system preferably emails a Web link to each invitee to inform the latter of any invitation directed to him or to her, 222. The Web link may include summary data about invitation data. The summary data may include information about the invitation, about the inviter, and about the reply to an invitation. However, if the result of determination at step 208 indicates that the user has not properly signed in, he or she may be denied to go further, 210.

Figure 3:
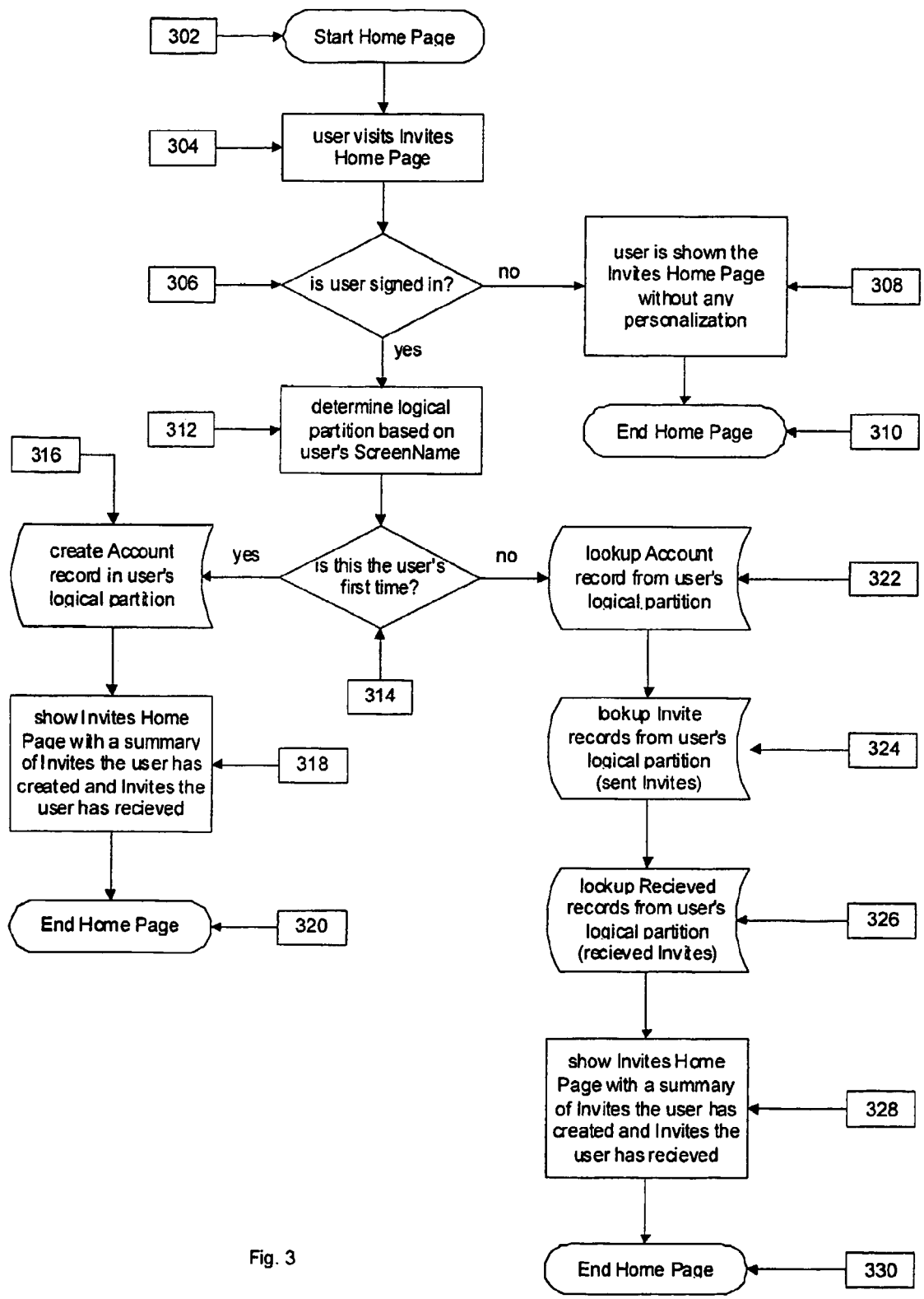
FIG. 3 is a schematic representation of viewing an invitation home page according to a preferred embodiment of the invention.

FIG. 3 shows a presently preferred embodiment of how a user may view a received invitation. After a user chooses to view the "invite home page" 304, the system determines whether the user has signed in, 306. If the result of determination at step 306 indicates that the user has not signed in, the system shows the "invites home page" to the user 308, without any personalization, and he or she may be denied to go further unless he or she properly sign in, 310. If, however, the user has properly signed in, the system determines the user's screen name, as explained above, and uses it to assign the user to a logical partition, 312. The system then determines whether the user is a first time user, 314. If so, the system creates an account record for the user in the user's logical partition, 316. The system then shows the user a summary of invitations that the user has created and the invitations that the user has received 318. If, however, the user is not a first-time user, the system looks up the user's existing account record that resides in the user's logical partition, 322. After the system looks up a user's invite records, 324, and the received records, 326, the system shows the user a summary of invitations that the user has created and the invitations that the user has received 328.

For example, as shown in FIG. 1(*a*), when Abe signs in to visit his home page 110, he is presented with the list of "invites sent" and "invites received." Here, since Abe has not invited anybody, there is no entry under "invites sent," as also is the case in the "invite" table in Abe's logical partition that resides in the physical database 1, 106. But, Abe is presented with a list of two "invites received" because Jer and Peter have invited Abe.

One advantage of the present invention is the saving in time that is achieved when searching data related to a user in a multiple-database system. Because each user is assigned to a logical database, and information about the data related to the user is stored in the logical partition assigned to the user, the system needs to look into only a single physical database that contains data related to the user. In the context of invitation data, for example, several inviters may create invitation data directed to an invitee. The invitation data created by each inviter is generally stored in a physical database assigned to the same inviter, through a logical partition assignment as discussed above. According to the presently preferred embodiment of the invention, when an invitee chooses to view his or her invitation home page, the system advantageously looks into only the logical partition that is assigned to the invitee for the list of all invitations received from all inviters for this invitee.

For example, the "invite received" information displayed on Abe's home page 110 is searched and retrieved from the logical partition assigned to Abe, which is mapped onto the physical database 1, 106. Although the "invites received" information displayed in home page 110 is obtained from invitation data stored in the physical database 2, 108, corresponding to Jer's invitation, and from invitation data stored in the physical database 3, 116, corresponding to Peter's' invitation, when Abe queries his invitation data, the system looks into only physical database 1, 106 to obtain "invites received" information. This advantageously eliminates the need to search multiple physical databases to obtain the list of received invitations.

Figure 4:
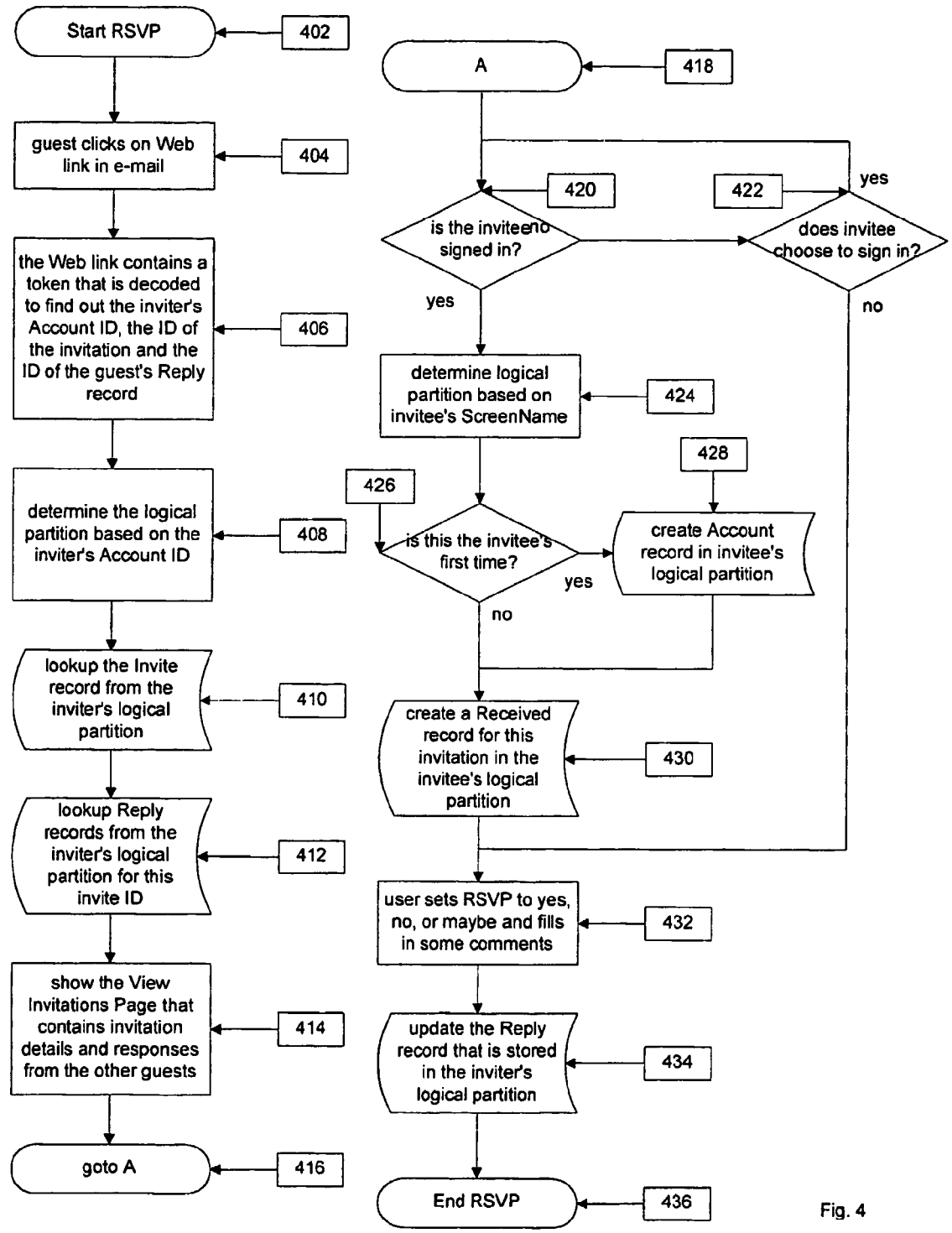
FIG. 4 is a schematic representation of responding to an invitation according to a preferred embodiment of the invention.

FIG. 4 shows a presently preferred embodiment of how a user may reply to a received invitation. A user may choose to select an invitation notice, preferably by clicking on a Web link in his or her e-mail page, 404. The system interprets the summary data associated with the selected invitation notice, which is maintained in the user's logical partitions, to find necessary information to obtain detailed information about the invitations. For example, a Web link may include a token that, when decoded, may reveal information such as an inviter's account identification information, the invitation identification information, and the reply record identification information, 406. Based on the inviter's account identification information, the system determines the logical partition assigned to the inviter's, 408. After looking up the invite record and the reply record, which preferably reside in the user's logical partition, the system may show the "view invitations page" that displays the invitation details and the responses from the other invitees to the invitation, 414.

To allow an invitee to reply to his or her invitations, the system determines whether the invitee has properly signed in, 420. If the invitee has properly signed in, the system determines identification information about the invitee, such as the user's screen name, and uses this information to assign the user to a logical partition, 424. The system then determines whether the user is a first time user, 426. If the invitee is a first-time user, the system creates an account record for the invitee, and stores it in the user's logical partition, 428. The system creates a "received record" for each invitation that the user has received, which is stored in the logical partition assigned to the invitee, 430. An invitee may then respond to an invitation, preferably by replying "yes," "no," or "maybe," and also may add some comments in his or her response, 432. Then, the system updates the invitee's reply record, which is stored in his or her logical partition, 434.

For example, as shown in FIG. 1(b), the "view invites page" 120 displays Abe's and Zek's reply to the Peter's invitation for lunch. This reply information is taken from Peter's reply table, which is stored in the logical partition assigned to Peter and mapped to physical database 3, 116.

Figure 5:
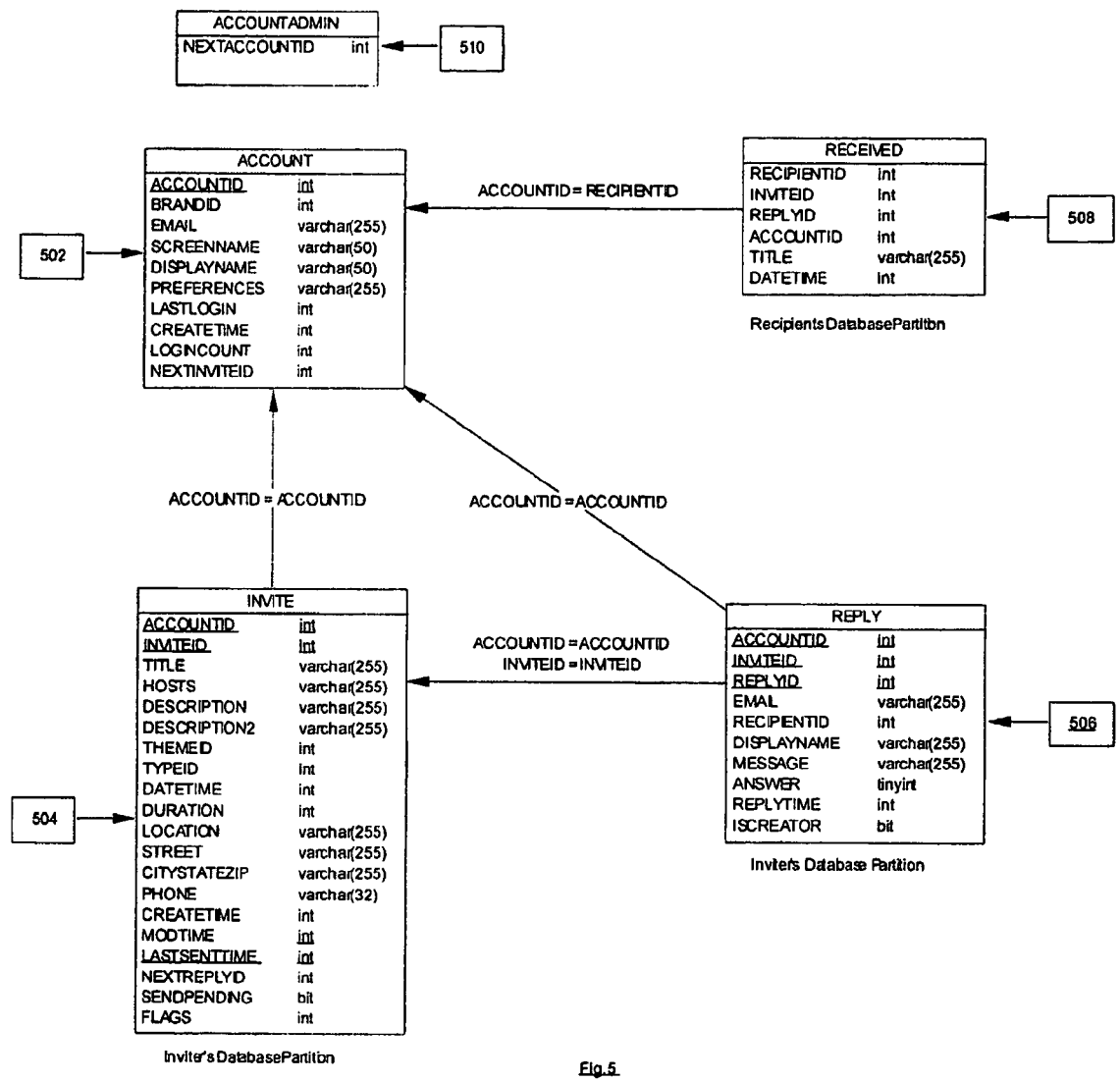
FIG. 5 is a schematic representation of arranging data according to a preferred embodiment of the invention.

FIG. 5 shows a presently preferred embodiment of arranging data, such as invitation data, in a user's logical partition.

For each user, whether an invitation creator or an invitee, an account record is established and maintained in his or her logical partition, as explained above in reference to FIG. 3. A user's account record is created based on the information received from the user during login process. An account record 502 preferably includes the following fields: "accountid" that identifies a user's account, "brandid" that identifies a user's "email" account vendor, "screenname" that is part of the user's "email," the user's "preferences," the user's "lastlogintime," the account's "creattime," and the account "logincount."

The invitation creator, or inviter, may create invitation data, which is preferably stored in an "invite" table 504, in the logical partition assigned to the invitation creator. The invite table preferably includes the invite fields that define the inviter, the invitees, the invitation, and the event of the invitation. The invite fields that identify an invitation creator preferably include "accountid" that identifies the creator's identification information, and "hosts" that identifies the members of the creator's party or family. The invite fields that define an invitation preferably include: "inviteid" that identifies a specific invitation, "createtime" that identifies the time the invitation was created, and "lastsenttime" that identifies the last time the invitation was sent to the invitees. Invitation creators may edit and resent their invitations as many times as they desire. The invite fields that identify an invitation event preferably include: "title" of the invitation event, such as birthday or anniversary; "description" of the invitation event; "datetime" that identifies the date and time of the event; and "duration" of the event. The invite table may also include "location," "street," and "citystatezip" that collectively define the address of the event.

A logical partition assigned to an invitation creator preferably includes a "reply" table. This table may include records that describe the invitees' replies and messages to an invitation. After an invitee chooses to view an invitation received in his or her received table, the reply record fields that identify the invitee are filled up. An inviter's reply record 506 preferably includes identification information, including the inviter's "accountid," the invitation's "inviteid," and the reply's "replyid." The inviter's reply record also includes information about the invitee, such information including invitee's "email," and "recipientid." After the invitee views the invitation home page that lists the invitations, he or she may choose to reply to an invitation. The invitee's reply record may include "answer" to an invitation. The reply record may also include a "message" from an invitee in reference to an invitation. The reply fields may further include the "replytime," which identifies the time of an invitee's reply to the invitation, and the "iscreator," which indicates whether the reply record is created by the invitation creator, who may also reply to and/or leave a message for an invitation.

The summary data that is sent from a creator's logical partition to a target invitee's logical partition, as described above, is preferably maintained in a "received" table. This received table is preferably maintained in the logical partition assigned to the invitee. The received table 508 includes fields that uniquely identify the creator's logical partition, where the detailed or full invitation data is maintained. These received table preferably include summary data that identifies the invitee; "recipientid," data that identifies the invitation; "inviteid," data that identifies the reply record; "replyid," and data that identifies the account record; "accounted." The received table preferably includes fields that identify the invitation event, including the "title" and the "datetime" of the event.

Thus, the system and method of the present invention save time in data query processing in multiple-database systems. By mapping a fixed number of logical partitions to potentially variable number of physical databases, and having the system and method of the present invention to look at the database system in terms of physical partitions, a scalable multiple-database system is achieved.

When a user of such system initiates a data query for data related to him or to her, only one database, which contains a summary data about the data related to the user, is searched, even if the data is scattered among multiple databases.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A computer implemented method for partitioning data in a database system, comprising the steps of:
   mapping said database system onto a fixed number of logical partitions, wherein said database system is distributed over a plurality of physical databases;
   assigning a user of said database system to a unique partition of said logical partitions, wherein number of said unique partitions is variable without changing said number of logical partitions;
   searching only one physical database of said plurality of databases using a search algorithm for data related to a user, wherein said search algorithm is operable before and after scaling said physical databases as a result of said scaling holding constant said number of logical partitions; and
   allocating a portion of said data that relates to said user to said unique partition.

2. The method of claim 1, wherein said assigning step is based on information received from said user.

3. The method of claim 2, wherein said information is received during said user's login process.

4. The method of claim 3, wherein said information includes said user's screen name.

5. The method of claim 3, wherein said information includes said user's login name.

6. The method of claim 1, wherein said portion of said data comprises:
   information about databases that contain data related to said user, wherein only said logical partitions related to said user are searched for said data.

7. The method of claim 1, further comprising the step of:
   scaling number of physical databases of said database system without changing said number of logical partitions.

8. A computer implemented method for searching data related to a user in a multiple-database system that is mapped onto a fixed number of logical partitions, comprising the steps of:
   determining a unique partition of said logical partition assigned to said user, wherein number of said unique partitions is variable without changing said number of logical partitions;
   identifying a database mapped to said unique partition; and
   using an algorithm for searching said database for said data, wherein said algorithm, operable prior to scaling said multiple-database system, is operable after said step of scaling, wherein said step of scaling holds said number of logical partitions constant.

9. The method of claim 8, wherein said determining step is based on information received from said user.

10. The method of claim 9, wherein said information is received during said user's login process.

11. The method of claim 10, wherein said information includes said user's screen name.

12. The method of claim 10, wherein said information includes said user's login name.

13. The method of claim 8, further comprising the steps of:
    searching said database for summary data that identifies databases that contain data related to said user; and
    using said summary data to provide said data related to said user by searching only said databases that contain data related to said user.

14. The method of claim 13, wherein said data related to said user comprises:
    data about an invitation.

15. The method of claim 14, wherein said summary data comprises:
    information that identifies said invitation;
    information that identifies who created said invitation; and
    information that identifies a reply for said invitation.

16. A computer implemented system for searching data related to a user, comprising:
    a plurality of databases in a database system, said plurality of databases mapped onto a fixed number of logical partitions;
    means for determining a unique partition of said logical partitions assigned to said user;
    means for identifying a database mapped to said unique partition of said logical partitions; and
    means for searching said database for said data, wherein said means operable prior to scaling said database system maintain operability after scaling said database system, wherein said scaling holds said number of logical partitions constant.

17. The computer system of claim 16, further comprising:
    means for searching said database for summary data that identifies databases that contain data related to said user; and
    means for using said summary data to provide said data related to said user by searching only said databases that contain data related to said user.

18. The computer system of claim 17, further implemented on a network environment.

19. The computer system of claim 18, wherein said network environment further comprises:
    an Internet.

20. A method for partitioning data in a database system, comprising the steps of:
    mapping said database system onto a number of logical partitions and onto a number of physical databases, wherein said data is partitioned in said database system;
    changing said number of said physical databases without changing said number of logical partitions;
    assigning a user of said database system to a unique partition of said logical partitions, and
    allocating a portion of said data that relates to said user to one unique partition of said number of logical partitions.

21. The method of claim 20, wherein said number of logical partitions is fixed.

22. The method of claim 21, further comprising the step of:

scaling said number of physical databases of said database system without changing said fixed number of logical partitions.

23. The method of claim 20, wherein said step of changing said number of physical databases further comprises:

scaling said physical databases without changing said number of logical partitions, wherein a search algorithm for finding data related to a user upon searching only one physical database of said number of physical databases operable prior to said step of scaling operates after said step of scaling.

* * * * *